Dec. 8, 1931.                A. L. KNAPP                1,835,163
                             MOTOR VEHICLE
                           Filed Dec. 31, 1927

Inventor
ARCHER L. KNAPP.
By Milton Silhtts
Attorney

Patented Dec. 8, 1931

1,835,163

UNITED STATES PATENT OFFICE

ARCHER L. KNAPP, OF DETROIT, MICHIGAN, ASSIGNOR TO PACKARD MOTOR CAR COMPANY, OF DETROIT, MICHIGAN, A CORPORATION OF MICHIGAN

MOTOR VEHICLE

Application filed December 31, 1927. Serial No. 243,821.

This invention relates to motor vehicles and more particularly to windows therefor.

An object of the invention is to provide a runway for a window glass.

Another object of the invention is to provide a cushioned runway for a window glass.

Another object of the invention is to provide an oilless runway for a window glass.

Another object of the invention is to provide a cushioned oilless runway for a window glass.

Yet another object of the invention is to provide a runway for a window glass in which rattling is avoided.

A further object of the invention is to provide a runway which will not be affected by weather conditions, particularly by dampness, and in which friction is reduced to a minimum.

A further object of the invention is to provide a runway for a window glass in which provision is made for expansion and contraction of the glass due to changes in weather conditions and for automatic adjustment to compensate for wear.

Yet a further object of the invention is to provide a hard rubber and graphite runway for a window glass and to embed the runway in soft rubber to provide a cushion support therefor.

Still a further object of the invention is to provide a runway for a window glass which shall be highly efficient in operation and yet of marked simplicity as a whole and in respect to each of its component parts, so that its manufacture is economically facilitated both as regards to parts and their assembly.

Figure 1:
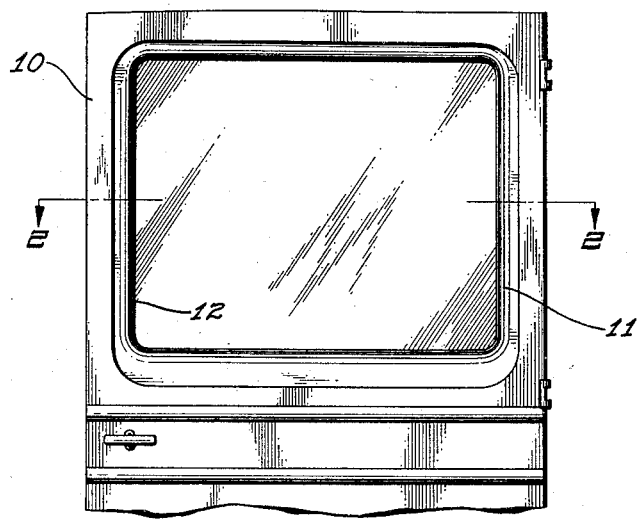
Figure 2:
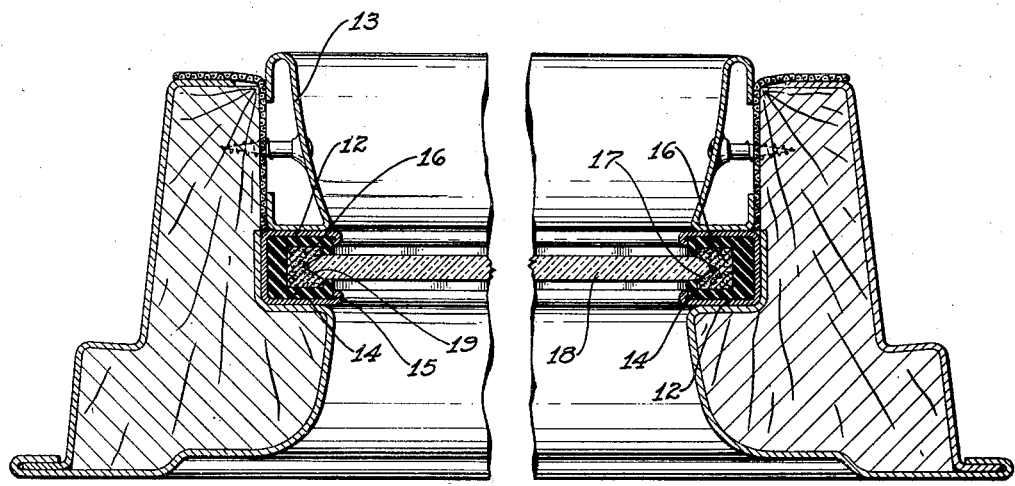
Figure 3:
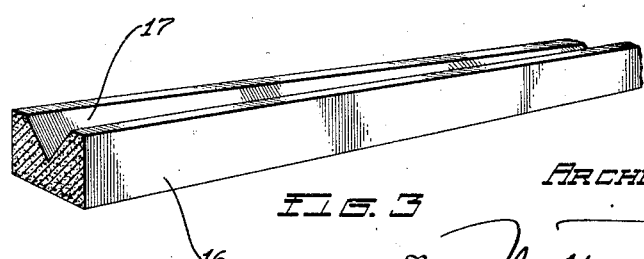

Other objects of the invention will appear from the following description taken in connection with the drawings which form a part of this specification, and in which:

Figure 1 is a side elevation of a door for a motor vehicle body, partly broken away, illustrating the invention as applied, Figure 2 is an enlarged sectional view taken on lines 2—2, Fig. 1, partly broken away, and Figure 3 is a perspective view of the runway.

Referring to the drawings for more specific details of the invention, 10 represents a door of a motor vehicle body comprising a window frame 11 having positioned therein oppositely disposed guide members in which is slidably mounted a window glass.

As shown, each of the guide members comprise a metallic retainer in the form of a U-shaped channel member 12 positioned in the rabbet on the side member of the frame and secured therein by any suitable means, as by a molding 13. A soft rubber packing member or jacket 14 is fitted in the channel member 12 and secured therein by turning or crimping the side walls of the channel member as indicated at 15. The soft rubber packing member or jacket provides a resilient cushion support for a runway 16. This runway is a composition of hard rubber and graphite and is provided with a longitudinal groove 17 for the reception of a window glass 18, the edge of which is beveled as indicated at 19 to engage the sides only of the groove and thus reduce to a minimum friction between these parts.

As shown, the runway 16 is embedded in the soft rubber packing memebr or jacket and the V-shaped groove in the runway registers with an opening in the jacket. The greatest width of the groove is substantially equal to the normal thickness of the window glass and the opening in the rubber jacket is the same width, accordingly, the runway is completely enclosed by the jacket and the glass snugly seated in the groove, thus, dampness and injury resulting therefrom is precluded.

The runway 16 is preferably constructed of a hard rubber and graphite composition requiring no lubrication though other oilless bearings may be employed with satisfactory results. The rubber jacket surrounding the runway permits expansion and contraction of the window glass without injurious effect to the runway or its associated parts and provides a very effective anti-rattler for the window glass since the structure is of a character which readily compensates for wear of the runway.

Although this invention has been described in connection with certain specific embodiments, the principles involved are susceptible of numerous other applications which will readily occur to persons skilled in the art. The invention is, therefore, to be limited only as indicated by the scope of the appended claims.

Having thus described the various features of my invention, what I claim is new and desire to secure by Letters Patent is:

1. A rigid runway for a window glass, a resilient jacket for the runway and a retainer for the jacket.

2. A runway for a window glass comprising a rigid member having a longitudinal groove and a resilient jacket for the member, the jacket having an opening communicating with the groove in the member.

3. A runway for a window glass comprising a rigid member having a longitudinal groove, a resilient jacket for the member, the jacket having an opening communicating with the groove in the member and a retainer for the resilient jacket.

4. A runway for a window glass comprising a rigid grooved member, a resilient jacket for the member, the jacket having an opening communicating with the groove in the member, a retainer for the resilient jacket and means for securing the resilient jacket in the retainer.

5. A runway for a window glass comprising a grooved member, a resilient jacket for the member, the jacket having an opening communicating with the groove in the member, a retainer for the resilient member and turned edges on the retainer for securing the jacket in position.

6. A runway for a window glass comprising a rigid grooved member, a resilient jacket enclosing the grooved member, the jacket having an opening in the wall thereof communicating with the groove in the member, a rigid retainer for the jacket, and means on the retainer for securing the jacket therein.

7. A runway for a window glass comprising a grooved oilless rigid bearing member, a resilient jacket therefor, the jacket completely enclosing the member and having a longitudinal slot therein registered with the groove in the member, a rigid metallic retainer for the resilient jacket, and means on the retainer for securing the jacket therein.

8. A runway for a window glass comprising a rigid grooved oilless bearing member having a longitudinal slot therein, a resilient jacket completely surrounding the bearing member and having a longitudinal slot therein registering with the slot in the bearing member, a rigid metallic casing enclosing the resilient jacket, and means on the rigid metallic casing for retaining the jacket therein.

9. A window, arranged for movement of the glass, comprising a window frame, a resilient jacket mounted in the frame and a rigid runway mounted in the jacket.

10. A rigid runway for window glass, impregnated with graphite and a resilient support for the runway.

11. In a window, arranged for movement of the glass, a window frame, oppositely disposed V-shaped runways, a glass bevelled at its edges to engage the runways and resilient supports in which the runways are mounted adapted to bias the runways toward each other, whereby the glass is closely engaged at all times.

In testimony whereof I affix my signature.
ARCHER L. KNAPP.